Figure 1:
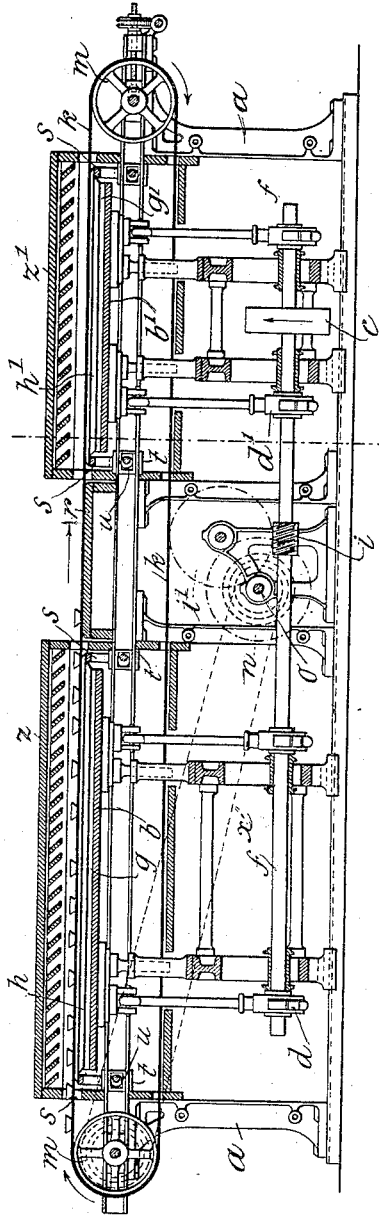

No. 725,237. PATENTED APR. 14, 1903.
P. R. FRANKE.
MACHINE FOR MOLDING BLOCKS OR TABLETS OF CHOCOLATE.
APPLICATION FILED FEB. 11, 1902.
NO MODEL. 2 SHEETS—SHEET 1.

WITNESSES.
Albert Jones
Samuel Percival

INVENTOR.
Paul Robert Franke
By his Attorneys.
Wheatley & MacKenzie

No. 725,237. PATENTED APR. 14, 1903.
P. R. FRANKE.
MACHINE FOR MOLDING BLOCKS OR TABLETS OF CHOCOLATE.
APPLICATION FILED FEB. 11, 1902.
NO MODEL. 2 SHEETS—SHEET 2.

WITNESSES
Albert Jones.
Samuel Percival

INVENTOR
Paul Robert Franke
By his Attorneys
Wheatley & MacKenzie

UNITED STATES PATENT OFFICE.

PAUL ROBERT FRANKE, OF LEIPZIG-PLAGWITZ, GERMANY.

MACHINE FOR MOLDING BLOCKS OR TABLETS OF CHOCOLATE.

SPECIFICATION forming part of Letters Patent No. 725,237, dated April 14, 1903.

Application filed February 11, 1902. Serial No. 93,563. (No model.)

*To all whom it may concern:*

Be it known that I, PAUL ROBERT FRANKE, a subject of the Emperor of Germany, whose post-office address is Markranstädterstrasse 1, Leipzig-Plagwitz, Germany, have invented certain new and useful Improvements in Machines for Molding Blocks or Tablets of Chocolate; and I do hereby declare the following to be a full, clear, and exact description of the invention, such as will enable others skilled in the art to which it appertains to make and use the same.

Hitherto chocolate has been made into blocks—that is to say, the stiff paste-like mass of chocolate has been uniformly distributed in the molds by means of a beating-table, which is rapidly and successively raised and lowered by the action of an eccentric or of a cam-disk, whereby the molds placed on the table are continuously exposed to violent shaking, which effects the uniform distribution of the stiff mass of chocolate in the molds. As in this work the molds are constantly jumping about on the beating-table, the noise produced is so great that it is extremely difficult to find workmen to attend to these beating-tables, as it is impossible to remain for a length of time in proximity to such machines. Much time is also lost in carrying the molds or "blocking-boards" to and from the breaking-tables, as well as by the interruptions thereby caused in the working of the beating-tables and to the staff employed in connection therewith. By the new machine this loss of time is avoided. Moreover, the adjustment of the stroke of the table, which at the beginning of the operation is greater than at the end thereof, is very troublesome and also involves a great loss of time. This loss of time is likewise obviated by the new machine, as the stroke adjusted for a particular sort of chocolate by means of a single handle remains fixed until another sort is dealt with.

The disadvantage attaching to the old beating-tables and mentioned above are got rid of by means of the machine that constitutes the present invention, the machine being constructed by combining two breaking-tables, the molds belonging to which are conveyed one after the other by means of an endless band, the tables being at such a distance apart that a free space is left between them in which the work of brushing and so-called "polishing" of the chocolate can be carried on, so that each of the beating-tables may be covered with a muffling or sound-deadening cap, observation of the working process being possible nevertheless.

Figure 3:
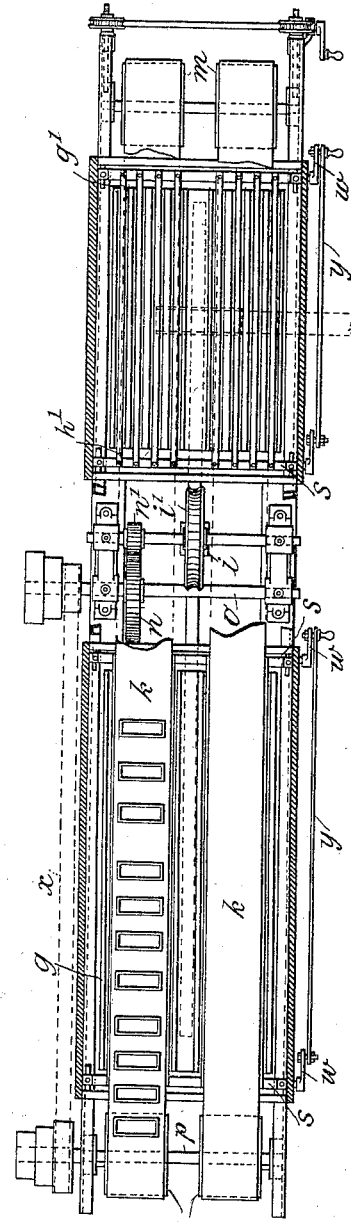
Figure 2:
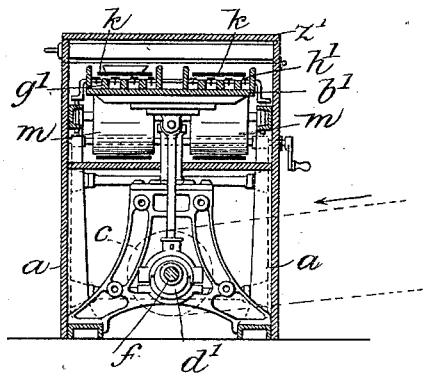
Figure 4:
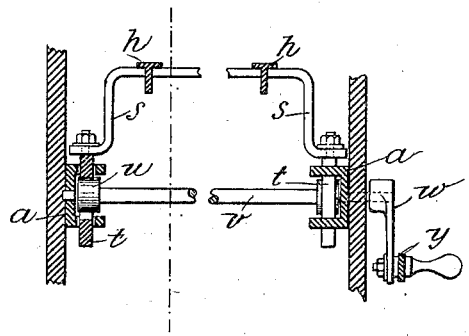
Figure 5:
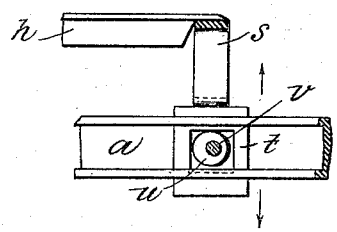

Figure 1 of the accompanying drawings is a sectional elevation of the improved machine; Fig. 2, a transverse section; Fig. 3, a plan. Figs. 4 and 5 illustrate the arrangement of a supporting means for the mold-carrier on a larger scale.

As already mentioned, the machine consists of two beating-tables $b\ b'$, placed at a certain distance apart within the machine-frame $a$ and quickly and successively raised and lowered by the action of the eccentrics $d\ d'$. (See Fig. 1.) The beating-tables $b\ b'$ are furnished in the longitudinal direction with ridges $g\ g'$ or other suitable elevations which come between the adjustable bars $h\ h'$, constituting a support for the mold-carrier, (see Fig. 2,) and so strike against the endless band $k$, that moves over the bars, and upon the return movement allow the belt to strike the bars $h\ h'$, whereby the desired shaking is effected. The beating-tables are covered by muffling-caps $z\ z'$. In the drawings, two endless bands $k$ for conveying the molds are shown by way of example, these being laid over rollers $m$ at the two ends of the machine.

The machine is driven by the belt-pulley $c$, keyed on the shaft $f$, that carries the eccentric. By means of the screw-gear $i\ i'$ and the spur-wheels $n\ n'$ the motion of the shaft $f$ is transmitted to the shaft $o$, which is connected by the belt $x$ with the fixed roller-shaft $p$.

Between the beating-tables $b\ b'$ is a bridge $r$, which is as such a height that the endless band or bands $k$ always lie firmly thereon, (see Fig. 1,) and consequently traverse the molds noiselessly at this spot from the first to the second beating-table and allow the brushing and polishing to proceed without hindrance or inconvenience.

In order that the strength of the blows may be regulated as required, the bars $h\ h'$ are arranged to be raised and lowered. They are supported by bent arms $s$, which are connected with the sliding pieces $t$, guided in the machine-frame $a$. In the central opening of each sliding piece is an eccentric $u$, fixed on the shaft $v$. (See Figs. 4. and 5.) Each set of bars has four eccentrics $u$, the shafts of which have cranks $w$ at one end, the cranks being so connected by a rod $y$ that all the eccentrics of one set of bars can be adjusted simultaneously. According as the eccentrics are rotated in the one or the other direction the bars are brought more or less near to the beating-tables, and the blows accordingly strengthened or weakened. On each adjusting arrangement is a scale which enables the bars to be accurately adjusted.

What I claim, and desire to secure by Letters Patent, is—

1. In a machine for making blocks or tablets of chocolate the combination with the beating-tables $b\ b'$, of muffling-caps $z\ z'$ inclosing the tables, and endless bands $k$ conveying the molds over the tables substantially as described.

2. A machine for making blocks or tablets of chocolate comprising beating-tables $b\ b'$, muffling-caps $z\ z'$ inclosing the tables, an endless mold-carrier band mounted to traverse along the tops of the tables, a support interposed between the band and tables, and ridges $g\ g'$ on the beating-tables adapted as the table moves upward to project through the support that is formed correspondingly to the ridges and strike against the endless band on which the molds stand and which moves over the said support.

3. In a machine for making chocolate into blocks or tablets the combination of two beating-tables, and a bridge connecting the two tables, with an endless band $k$ that conveys the molds from one end of the machine to the other and constantly lies on the bridge or connecting-piece.

4. A machine for making blocks or tablets of chocolate comprising beating-tables $b\ b'$, muffling-caps $z\ z'$ inclosing the tables, an endless mold-carrier band mounted to traverse along the tops of the tables, a support interposed between the band and tables, bent arms $s$ supporting the said support, eccentrics adapted to act on the arms to raise or lower the said support and thereby adjust the distance of the endless band from the striking-tables for strengthening or weakening the blow according to requirements.

In testimony whereof I have affixed my signature in presence of two witnesses.

PAUL ROBERT FRANKE.

Witnesses:
HERM. FALK,
RUDOLPH FRICKE.